United States Patent
Rocker

(10) Patent No.: US 8,342,128 B2
(45) Date of Patent: Jan. 1, 2013

(54) VISCOUS PET FOOD DISPENSING APPARATUS

(76) Inventor: Karla S. Rocker, St. Joseph, MO (US)

( * ) Notice: Subject to any disclaimer, the term of this patent is extended or adjusted under 35 U.S.C. 154(b) by 5 days.

(21) Appl. No.: 12/862,754

(22) Filed: Aug. 24, 2010

(65) Prior Publication Data

US 2011/0041771 A1 Feb. 24, 2011

Related U.S. Application Data

(60) Provisional application No. 61/236,374, filed on Aug. 24, 2009.

(51) Int. Cl.
*A01K 5/01* (2006.01)
*A01K 1/10* (2006.01)

(52) U.S. Cl. ...................... 119/61.2; 119/61.5

(58) Field of Classification Search .................. 220/578; 222/405, 386; 119/61.54, 61.5, 61.53, 61.55, 119/61.2, 61.1, 57; 99/495, 506–508
See application file for complete search history.

(56) References Cited

U.S. PATENT DOCUMENTS

| 344,447 | A | | 6/1886 | Johnston | |
|---|---|---|---|---|---|
| 1,065,823 | A | | 6/1913 | Matthews | |
| 1,603,013 | A | | 10/1926 | Bagley | |
| 2,572,960 | A | | 10/1951 | Steans | |
| 2,601,767 | A | * | 7/1952 | Wall | 220/719 |
| 2,763,405 | A | | 9/1956 | Shvetz | |
| 3,040,897 | A | * | 6/1962 | Holman | 210/244 |
| 3,249,265 | A | | 5/1966 | Wershaw | |
| 3,589,340 | A | * | 6/1971 | Beliles | 119/61.54 |
| 4,831,681 | A | * | 5/1989 | Puder | 15/257.05 |
| 4,948,078 | A | | 8/1990 | Dumenigo | |
| 5,148,951 | A | | 9/1992 | Moure | |
| 5,219,091 | A | | 6/1993 | Paramski | |
| 5,370,260 | A | | 12/1994 | Paramski | |
| 5,411,182 | A | | 5/1995 | Marte | |
| 5,634,569 | A | * | 6/1997 | DeCoster | 220/735 |
| 5,676,275 | A | * | 10/1997 | Khattar | 220/575 |
| 5,706,721 | A | | 1/1998 | Homes | |
| 5,887,544 | A | * | 3/1999 | Popelier | 119/61.54 |
| 5,938,062 | A | | 8/1999 | Paramski | |
| 5,971,202 | A | * | 10/1999 | Filbrun | 220/719 |
| 6,153,237 | A | * | 11/2000 | Ferguson | 426/115 |
| 6,314,911 | B1 | * | 11/2001 | Kaytovich | 119/61.5 |
| D459,952 | S | * | 7/2002 | Bellander | D7/667 |
| 7,544,294 | B2 | * | 6/2009 | Halterman | 210/232 |
| 7,562,773 | B2 | * | 7/2009 | Cotsalas | 206/303 |
| 7,753,000 | B1 | * | 7/2010 | Turner | 119/61.2 |
| 8,082,882 | B1 | * | 12/2011 | Tharp | 119/60 |
| 2005/0230431 | A1 | | 10/2005 | Thiebaut | |

* cited by examiner

*Primary Examiner* — Kristen C Hayes
(74) *Attorney, Agent, or Firm* — Erickson, Kernell, Derusseau & Kleypas, LLC

(57) ABSTRACT

An apparatus for dispensing viscous pet food includes a rigid, downwardly curved, perforated dispensing sheet and a container having a cylindrical inner sidewall and a bottom surface that conforms to the dispensing sheet. The dispensing sheet preferably features a plurality of recesses and the container a plurality of corresponding rails that allow the sheet to stably descend within the container as downward pressure is applied to the sheet and the viscous food is dispensed and consumed.

25 Claims, 4 Drawing Sheets

VISCOUS PET FOOD DISPENSING APPARATUS

This nonprovisional application claims the benefit of provisional application 61/236,374.

BACKGROUND

The present invention generally relates to dispensing devices, and it is specifically directed to a dispensing device comprising, primarily, a container portion within which viscous material may be held, as well as a perforated, curved disc element through which the viscous material may be dispensed by extrusion in a somewhat controlled fashion. As will be discussed, the configuration of the present apparatus makes it particularly effective for use as a pet food dispenser.

Apparatuses for dispensing viscous materials are well known in the prior art. One pertinent example of such apparatus is found in U.S. Pat. No. 5,148,951 to Moure, et al. In fact, Moure discloses a dispensing package for gel and semi-solid cleaning and skin care compositions. The package includes a container for holding the composition and an apertured dispensing sheet that is to rest upon the composition. The perimeter of the apertured dispensing sheet is configured to conform to the interior geometry of the container (e.g., circular or rectangular), except that the dispensing sheet has a diameter less than the interior diameter(s) of the fully vertical or tapered walled container so that the sheet may descend downward with the diminishing level of material within the container as force is applied to the sheet and extruded material is removed.

In an embodiment of the Moure package in which the container component has tapered sidewalls, the dispensing sheet is flexible and has flexible, semicircular tabs extending outward from its perimeter. So, as the sheet advances toward the bottom of the container, its tabs, when they eventually come into contact with the converging container sidewalls, flex upward as the sheet is further forced toward the container bottom. Furthermore, if a user applies a force that distributes unevenly throughout the Moure dispensing sheet, the flexibility of the sheet's perimeter helps prevent the sheet from breaking, permanently deforming or possibly becoming misaligned within the container when a perimeter section of the sheet impinges on the container sidewall.

Another example of relevant prior art is found in U.S. Pat. No. 5,411,182 to Marte, et al. Although similar to that disclosed in Moure, a distinguishing characteristic of the apparatus described in Marte is that its corresponding dispensing element is a substantially rigid, plate-like perforated device that is non-planar in the respect that it features an alternating pattern of raised and recessed areas. The purpose of those recessed areas is to collect and retain any water, dirt or other foreign debris that is transferred to the dispensing element by a finger or other implement that presses against it. Furthermore, the plate-like dispensing element is substantially rigid, unlike its counterpart element disclosed in Moure, in order that downward pressure applied to it is distributed fairly evenly across its entire dimensions. However, much like Moure, Marte discloses that the dispensing element may have peripheral tabs that upwardly flex upon impact with the interior sidewall of the container element.

Nevertheless, while the aforementioned and other prior art devices may be perfectly adequate for extrusion dispensing semi-solid matter at the press of a finger or other implement in a wide variety of applications, the present inventor notes that none of the prior art devices are well-adapted to function specifically as pet animal feeding devices. To wit, known prior art devices are not ideally configured to dispense viscous food material in a way that is particularly accommodating to the arcuate path of the lapping motion that an animal's tongue makes to ingest food and liquid.

For example, were a substantially flexible dispensing sheet to be used (e.g., Moure) in an animal food dispensing device, downward deflection of the dispensing sheet, in response to a load applied by an animal tongue and opposing force exerted by semi-solid food material disposed below the sheet, would cause food material to primarily extrude through sheet openings located within the vicinity of the rapidly moving tongue load placement. That is because, as the sheet flexes downward, food material located within the area in which it vertically deflects is pierced through the sheet openings. However, since the tongue swipes through that area so rapidly, the sheet's deflection can be quite counterproductive to feeding. For one, the animal's tongue momentarily covers sheet apertures within much of the area of deflection and, therefore, inhibits food from being extruded in the deflection zone. Secondly, since load is not evenly distributed to areas outside the vicinity of tongue-sheet contact, the sheet's flexing necessitates that the animal apply greater force in order to extrude food through the sheet apertures that are momentarily outside of the contact area and unobstructed by the tongue. Furthermore, because of the quick upward return that the animal's tongue in the lapping motion, the animal is essentially required to dispense food with a first tongue motion before being able to actually gather it with a subsequent one. And because the sheet may, depending on its flexibility, quickly return to its planar profile as the tongue load is removed, much of the viscous material that was extruded in that first tongue lap my retreat back under the dispensing sheet just prior to being able to be scooped in the immediate next one. So, even though the very purpose of such a dispensing container may be to meter an animal's consumption, a flexible dispensing sheet element may actually over-restrict the container's food dispensation rate to the point of frustrating an animal.

Conversely, using a substantially rigid, planar and/or plate-like dispensing sheet of the prior art to control the output of viscous food can also be problematic. For one, the inflexibility of it may be understandably discomforting to the animal's tongue, as it presents an abrupt barrier against the tongue's downward, arcuate scooping motion. Also, dispensed food material can become aggregated along the hard-to-reach circumferential corner formed by the container sidewall(s) and outer edge of a plate-like sheet. This could ultimately cause a significant portion of the dispensed food material to be wasted, if the animal cannot retrieve it. Even worse, an animal could end up getting its tongue pinched, or even lacerated, while attempting to pry it into these perimeter areas in order to extract food. After all, there is likely to be a small gap between the rim of a dispensing sheet and the container sidewall for enabling the sheet to descend vertically within the container.

Consequently, the present inventor recognizes a need for an improved dispensing apparatus that is specially adapted to facilitate the controlled consumption of non-solid pet foods by dogs, cats and potentially other pet animals, without posing the limitations and hazards of prior art extrusion dispensing apparatuses. The present invention for a viscous pet food dispensing apparatus substantially fulfills this need.

SUMMARY

It is an object of the present invention to provide a viscous material dispensing apparatus that dispenses pet food to a feeding animal in a controlled, yet sufficiently plentiful, manner and that does not lend itself to becoming jammed, misaligned or disassembled by the animal under any foreseeable circumstance. It is further object of the invention to be configured so as to eliminate the risk of inducing oral injury to a feeding animal.

In one aspect of the present invention, the apparatus comprises a container and a rigid, perforated dispensing sheet, as do many known prior art dispensing devices, but its dispensing sheet has a profile that is distinguishable from that of its prior art counterparts. Specifically, the perforated dispensing sheet has a non-planar, downwardly concave profile that is intended serve at least the following two important purposes: (1) to conform, to some extent, to the arcuate lapping motion that a dog or cat tongue typically makes during feeding; and (2) to cause a disproportionate amount of the viscous food material that has dispensed up through it to be exposed around its center, thereby rendering a more easily scoopable food mass at the apex of the tongue motion and encouraging the animal to not pry its tongue into any gap that may exist between the sheet and the adjacent container sidewall.

In another aspect of the present invention, the apparatus's container component features a plurality of vertical rails along its interior sidewall, while conforming recesses are formed along the perimeter of its dispensing sheet component. These distinctive rails and recesses cooperate to enable the dispensing sheet to stably move downward within the container as pressure is applied by an animal's tongue and the container's contents gradual empty.

In another aspect of the invention, a pair of pull tabs may extend up from near edges of the dispensing sheet so that a pet owner can easily lift the sheet from the container in order to refill or clean the apparatus.

In yet another aspect of the invention, the perimeter edges of the rigid dispensing sheet may be coated by a slippery material so as to enable the sheet to travel within the container without there needing to be any radial separation between there perimeter of the sheet and the interior sidewall of the container.

DESCRIPTION OF A PREFERRED EMBODIMENT

As will become apparent from the discussion below in connection with the accompanying drawings, the present disclosure has particular applicability to apparatuses used to dispense pet food material to a feeding pet animal in a regulated manner. However, those having skill in the art should appreciate that the present disclosure has general applicability to apparatuses for dispensing viscous material beyond animal feeding applications.

Figure 1:
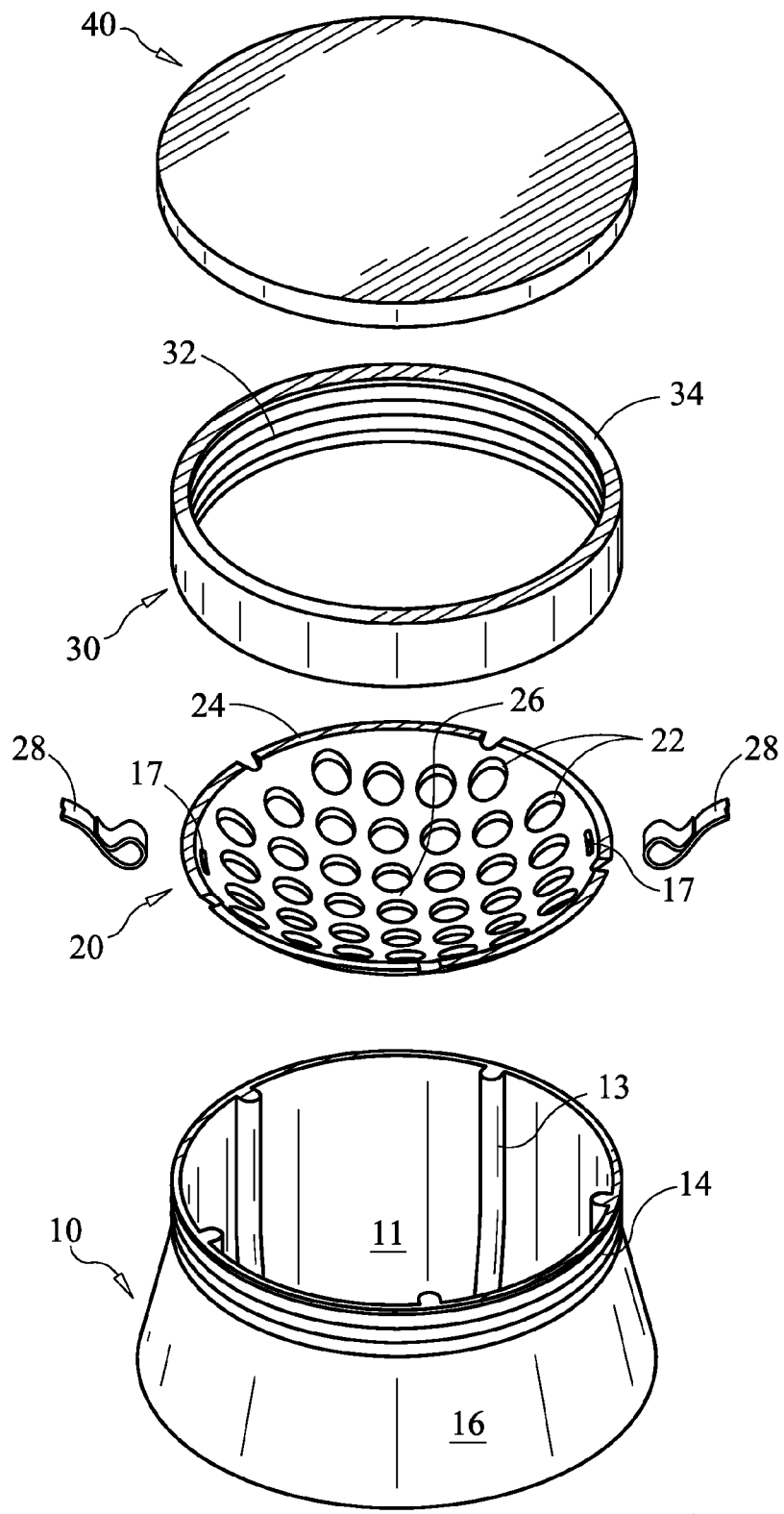
FIG. 1 is a top perspective view of a viscous pet food dispensing apparatus in accordance with the present disclosure, the apparatus being shown in a fully disassembled state and empty of any food contents.
Figure 2:
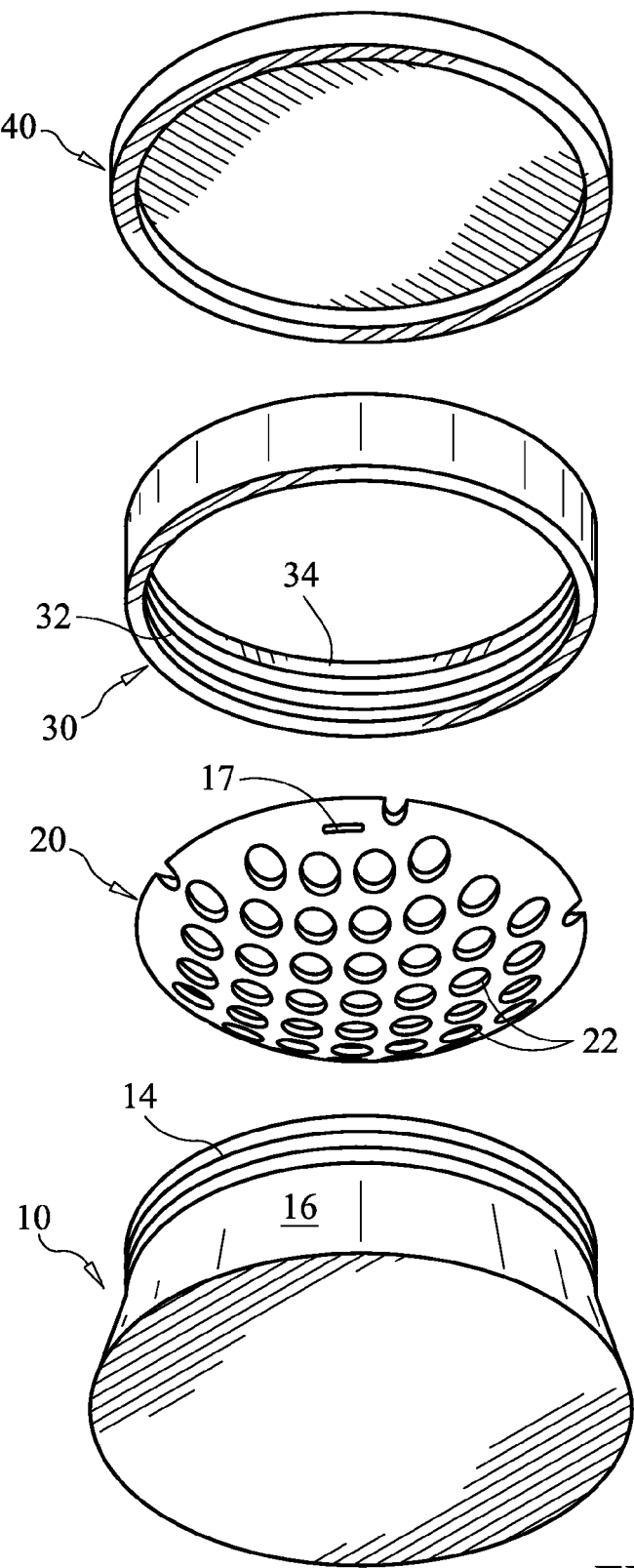
FIG. 2 is a bottom perspective view of the dispensing apparatus of FIG. 1, except that its pair of pull tab components are not included.

Referring now to FIG. 1, there is illustrated a disassembled preferred embodiment of pet food dispensing apparatus which principally comprises: (a) a container 10 for holding viscous pet food, (b) a rigid, downwardly concave and perforated dispensing sheet 20 through which the food may be extruded; and (c) an annular ring or collar 30 for attaching to the container 10 and preventing the dispensing sheet 20 from being inadvertently (from the pet owner's perspective, anyway) displaced from the container 10. Also included in a preferred embodiment of the dispensing apparatus, and shown in FIG. 1, is a lid 40 for sealing the apparatus between feeding sessions as well as a pair of tabs 28 that enable a pet owner to grip and pull the dispensing sheet 20 up out of the collarless container 10 in order to clean the apparatus.

Figure 4:
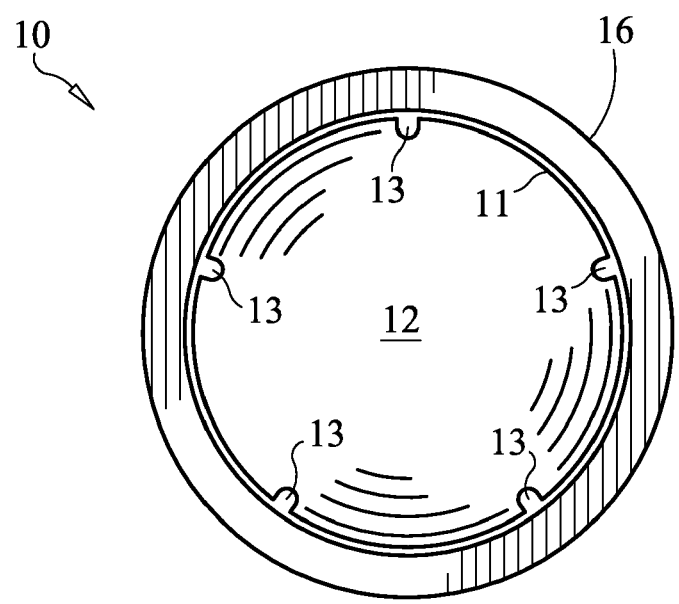
FIG. 4 is a top plan view of the container component of the dispensing apparatus.

As can be gleaned from several of the drawings, the container 10 preferably has a tapered exterior sidewall 16 that has a greater diameter at its base 15 than at its neck 14 in order to inhibit the apparatus from toppling during use, and to further improve stability, the base 15 may be disproportionately weighted by some means. However, an alternative embodiment of the container 10 may feature a substantially vertical exterior sidewall 16. In either case, as seen most clearly in FIGS. 5 & 6, the container's interior sidewall 11 has a substantially vertical and cylindrical geometry until its lower end meets the container's shallow bowl-shaped interior bottom surface 12. A plurality of evenly circumferentially spaced ribs or rails 13 runs down the interior sidewall 11 of the container 10, as shown in FIGS. 1 & 4. The rails 13 taper off at the bottom end of the sidewall 11, as the container surface slopes inward to form its bowl-shaped bottom 12. Finally, a screw thread-bearing neck 14 is at the top of the container 10.

The rigid dispensing sheet 20 has a circular perimeter, and to allow it to freely move vertically within the container 10, it has a diameter that is slightly smaller (e.g., 3 mm smaller) than the container's diameter along its cylindrical interior sidewall 11. Viscous food material passes through a plurality of openings 22 formed within the dispensing sheet 20. Preferably, these openings 22 are sized in accordance with the texture and particle size of the food material that is to be dispensed.

Figure 5:
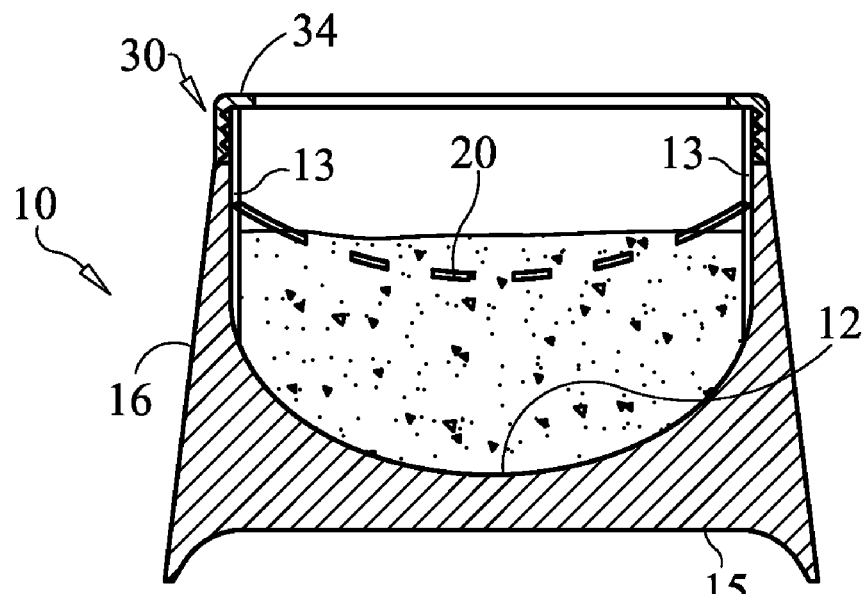
FIG. 5 is an elevational view of the apparatus being shown assembled, except that its pull tabs lid component are not shown, and in cross section with its container holding food material.
Figure 6:
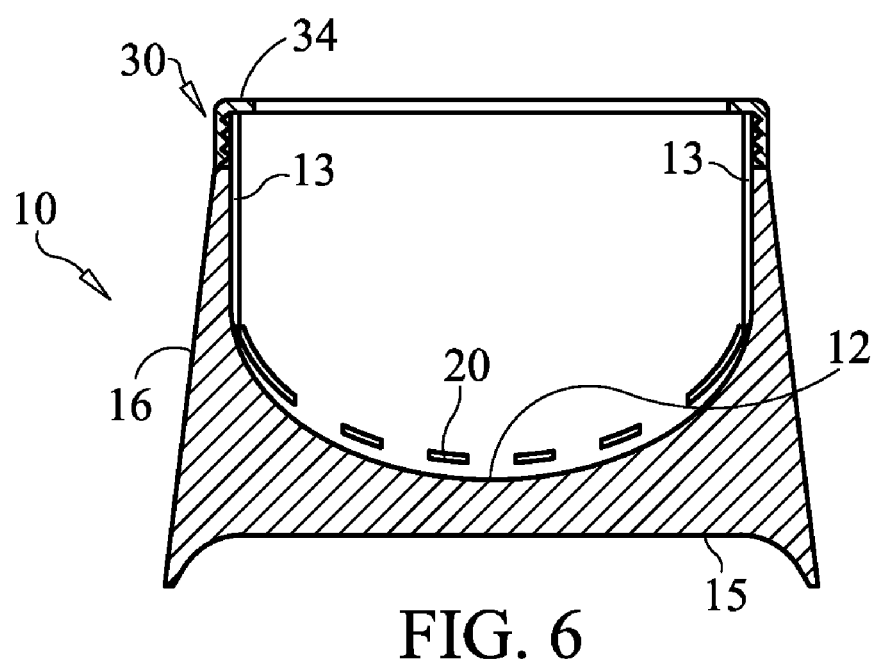
FIG. 6 an elevational view of the apparatus similar to that shown in FIG. 5, except that the container is empty of any food contents.

As previously described, the dispensing sheet 20 has a curved or concave configuration. Its concave shape allows it to at least somewhat cooperate with the arcuate scooping motion that a dog or cat's tongue will typically make during feeding. More specifically, as the animal's tongue laps along the dispensing sheet 20, the circular trough profile of the sheet 20 allows the tongue to comfortably advance down toward the bottom of that trough, effectively directing tongue-applied load toward the sheet center 26. This phenomenon has a couple of important effects. First, it tends to minimize any torque that the sheet 20 would experience and any friction that might be induced along its perimeter if the sheet 20 had a flatter profile and was subjected to vertical load concentrated a considerable distance from its center 26. Second, as the animal's motioning tongue presses the sheet 20 down and filters viscous material up through its openings 22, a very extractable circular trough of food forms above and about the depressed center 26 of the sheet 20, as depicted in FIG. 5. Furthermore, the animal's lapping tongue will actually gather some of the viscous composition that becomes disposed above a distal portion of the tongue's sweeping path along the dispensing sheet 20. And as a consequence of the greatest aggregation of extruded food being consistently found above the center 26 of the dispensing sheet 20, an animal will quickly learn to focus its tongue in that area, further limiting any torque on the sheet 20 or potential friction from contact with the container sidewall 11.

Figure 3:
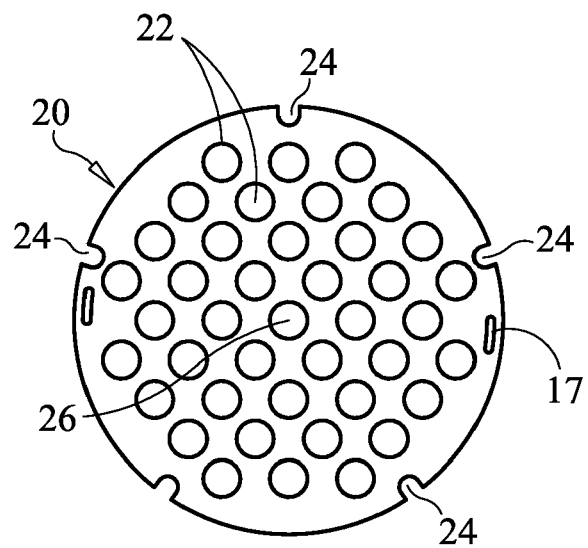
FIG. 3 is a top plan view of the dispensing sheet component of the dispensing apparatus.

Nevertheless, to even better ensure that the sheet 20 stably descends with the food level, a plurality of notches or recesses 24, as seen in FIG. 3, are formed with the sheet's perimeter to correspond with the rails 13 along the container sidewall 11. Further, to ensure that the dispensing sheet 20 is not dislodged from the container 10 during animal feeding, the collar 30 is secured to the threaded neck 14 of the container 10. The top of the collar 30 features a short inward flange 34 that will retain the dispensing sheet 20 if necessary.

The interior bottom 12 of the container 10 should conform to the profile of the dispensing sheet 20 so that no food remains trapped under the sheet 20 and unable to be extracted by the animal.

To facilitate cleaning and reuse of the apparatus, a pair of opposing pull tabs 28 are positioned near the perimeter of the dispensing sheet 20. Preferably, each tab is fabricated of a disposable adhesive strip that can be slid through a slit 17, that is formed within the sheet 20 circumferentially outside of its dispensing holes 22, and then adhered to itself to form a pulling segment and a loop section that secures it to the sheet 20. Of course, those skilled in the art will appreciate that the pull tabs 28 can comprise a wide array of materials, and their placement along and means for securing to the sheet 20 can be varied.

Finally, in a preferred embodiment of the apparatus, a snap-fitting lid 40 places directly over either the collar 30 or the container neck 14 so that residual pet food may be airtightly stored within the container 10 between uses.

Aspects of various embodiments of the present invention that are not recited above or claimed below may be noted from observing the illustrations included herein.

What is claimed is:

1. An apparatus for dispensing viscous food to an animal using its tongue, the apparatus comprising:
   a container for holding the viscous food, wherein the container has a bottom, a sidewall, and an open top; and
   a concave dispensing sheet curving upward about a periphery of the dispensing sheet towards said open top and having a plurality of apertures formed therethrough, including apertures located proximate a center of said dispensing sheet, said dispensing sheet having a circular trough profile which allows the tongue of an animal to advance toward and across the center of the dispensing sheet in a downward arcuate path, the dispensing sheet being slideably moveable along the sidewall toward and against a portion of the viscous food disposed between the dispensing sheet and the bottom of the container upon pressing of the tongue of the animal thereagainst to extrude at least a portion of the food through at least one of the plurality of apertures.

2. The apparatus of claim 1, wherein guide rails are disposed along said container's sidewall and conforming recesses are formed within said sheet's perimeter, wherein the recesses receive the guide rails and improve the stability of said sheet's vertical movement within said container.

3. The apparatus of claim 2, further comprising a lid for sealably covering the top opening.

4. The apparatus of claim 2, further comprising a collar that threadably engages the top of said container, wherein the collar is configured to retain said sheet within said container.

5. The apparatus of claim 4, further comprising a lid for sealably covering the top opening, wherein the lid mounts onto said collar.

6. The apparatus of claim 2, wherein an interior surface of said bottom of said container is curved to conform to said sheet.

7. The apparatus of claim 2, wherein an exterior sidewall of said container is tapered such that an exterior bottom diameter is greater than an exterior top diameter in order to inhibit said container from toppling.

8. The apparatus of claim 7, wherein the bottom of said container is disproportionately weighted in order to further inhibit said container from toppling.

9. The apparatus of claim 1, further comprising a lid for sealably covering the top opening.

10. The apparatus of claim 1, further comprising a collar that threadably engages the top of said container, wherein the collar is configured to retain said sheet within said container.

11. The apparatus of claim 10, further comprising a lid for sealably covering the top opening, wherein the lid mounts onto said collar.

12. The apparatus of claim 1, wherein an interior surface of said bottom of said container is curved to conform to said sheet.

13. The apparatus of claim 1, wherein an exterior sidewall of said container is tapered such that an exterior bottom diameter is greater than an exterior top diameter in order to inhibit said container from toppling.

14. The apparatus of claim 13, wherein the bottom of said container is disproportionately weighted in order to further inhibit said container from toppling.

15. The apparatus of claim 1 in combination with a quantity of the viscous pet food positioned in the container between the first end and the dispensing sheet, the portion being extruded through one or more of the apertures in the sheet by pressing of the tongue of the animal against the sheet toward the bottom of the container.

16. An apparatus for dispensing viscous food to an animal using its tongue, the apparatus comprising:
   a container having a hollow interior formed by a closed first end, a sidewall, and an open second end, the first end being concave and extending in a direction away from the open second end;
   a concave dispensing sheet having a plurality of apertures extending through the thickness of the sheet, including apertures located proximate a center of the sheet, the sheet having a circular trough profile that curves upward about a periphery of the dispensing sheet towards said open top and allows the tongue of an animal to advance toward and across the center of the sheet in a downward arcuate path, the sheet being configured to conform to the first end of the container and being slideably moveable along the sidewall toward the first end of the container;
   a plurality of guide rails disposed along an interior surface of the sidewall and extending along at least a portion of the length of the sidewall between the first and second ends;
   a plurality of conforming recesses disposed along the perimeter of the sheet, the recesses receiving the guide rails and stabilizing movement of the sheet along the length of the sidewall and within the interior of the container; and
   a portion of viscous food disposed in the container between the first end and the sheet, the portion being extruded through one or more of the apertures in the sheet by movement of the sheet toward the first end in response to the tongue of the animal pressing against the sheet.

17. The apparatus of claim 16, further comprising a collar that threadably engages the second end of the container to retain the sheet within the container.

18. The apparatus of claim 16, further comprising a lid that sealably encloses the open second end and mounts onto the collar.

19. The apparatus of claim 16, wherein an exterior sidewall of the container is tapered to provide an exterior first diameter that is greater than an exterior second diameter in order to inhibit the container from toppling.

20. The apparatus of claim 19, wherein the container is disproportionately weighted to further inhibit the container from toppling.

21. An apparatus for dispensing viscous food, the apparatus comprising:
   a container for holding the viscous food, wherein the container has a bottom, a sidewall, and an open top;
   a non-planar, downwardly curved dispensing sheet having a plurality of apertures formed therethrough, the sheet being moveable toward and against a portion of the viscous food disposed between the dispensing sheet and the bottom of the container to extrude at least a portion of the food through at least one of the plurality of apertures;
   a collar that threadably engages the top of said container and configured to retain said sheet within said container; and
   a lid that mounts onto said collar for sealably covering the top opening.

22. An apparatus for dispensing viscous food, the apparatus comprising:
   a container for holding the viscous food, wherein the container has a bottom, a sidewall, and an open top, the sidewall including a plurality of guide rails disposed thereon and extending a distance between the bottom and the open top;
   a non-planar, downwardly curved dispensing sheet having a plurality of apertures formed therethrough, the dispensing sheet being moveable toward and against a portion of the viscous food disposed between the dispensing sheet and the bottom of the container to extrude at least a portion of the food through at least one of the plurality of apertures, the sheet including recesses formed within said sheet's perimeter and conforming to the guide rails in the sidewall of the container to receive the guide rails and improve the stability of said sheet's vertical movement within said container; and
   a collar that threadably engages the top of said container, wherein the collar is configured to retain said sheet within said container.

23. The apparatus of claim 22, further comprising:
   a lid for sealably covering the top opening, wherein the lid mounts onto said collar.

24. An apparatus for dispensing viscous food, the apparatus comprising:
   a container having a hollow interior formed by a closed first end, a sidewall, and an open second end, the first end being concave and extending in a direction away from the open second end;
   a concave dispensing sheet having a plurality of apertures extending through the thickness of the sheet, the sheet being configured to conform to the first end of the container and being moveable toward the first end of the container;
   a plurality of guide rails disposed along an interior surface of the sidewall and extending along at least a portion of the length of the sidewall between the first and second ends;
   a plurality of conforming recesses disposed along the perimeter of the sheet, the recesses receiving the guide rails and stabilizing movement of the sheet along the length of the sidewall and within the interior of the container;
   a portion of viscous food disposed in the container between the first end and the sheet, the portion being extruded through one or more of the apertures in the sheet by movement of the sheet toward the first end; and
   a collar that threadably engages the second end of the container to retain the sheet within the container.

25. An apparatus for dispensing viscous food, the apparatus comprising:
   a container having a hollow interior formed by a closed first end, a sidewall, and an open second end, the first end being concave and extending in a direction away from the open second end;
   a concave dispensing sheet having a plurality of apertures extending through the thickness of the sheet, the sheet being configured to conform to the first end of the container and being moveable toward the first end of the container;
   a plurality of guide rails disposed along an interior surface of the sidewall and extending along at least a portion of the length of the sidewall between the first and second ends;
   a plurality of conforming recesses disposed along the perimeter of the sheet, the recesses receiving the guide rails and stabilizing movement of the sheet along the length of the sidewall and within the interior of the container; and
   a portion of viscous food disposed in the container between the first end and the sheet, the portion being extruded through one or more of the apertures in the sheet by movement of the sheet toward the first end,
   wherein an exterior sidewall of the container is tapered to provide an exterior first diameter that is greater than an exterior second diameter in order to inhibit the container from toppling.

* * * * *